June 16, 1964   W. S. LEPPER   3,137,272
ANIMAL FEEDER
Filed Dec. 6, 1962
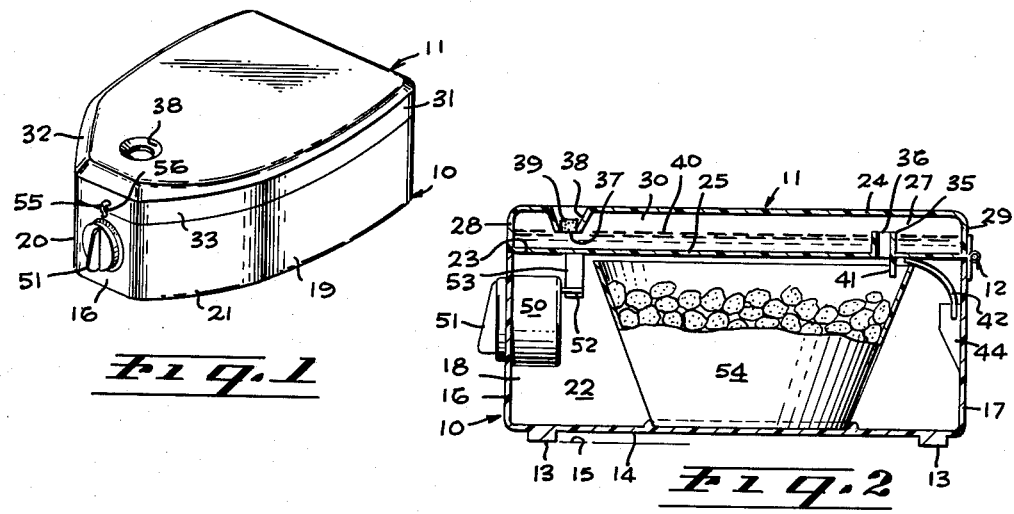
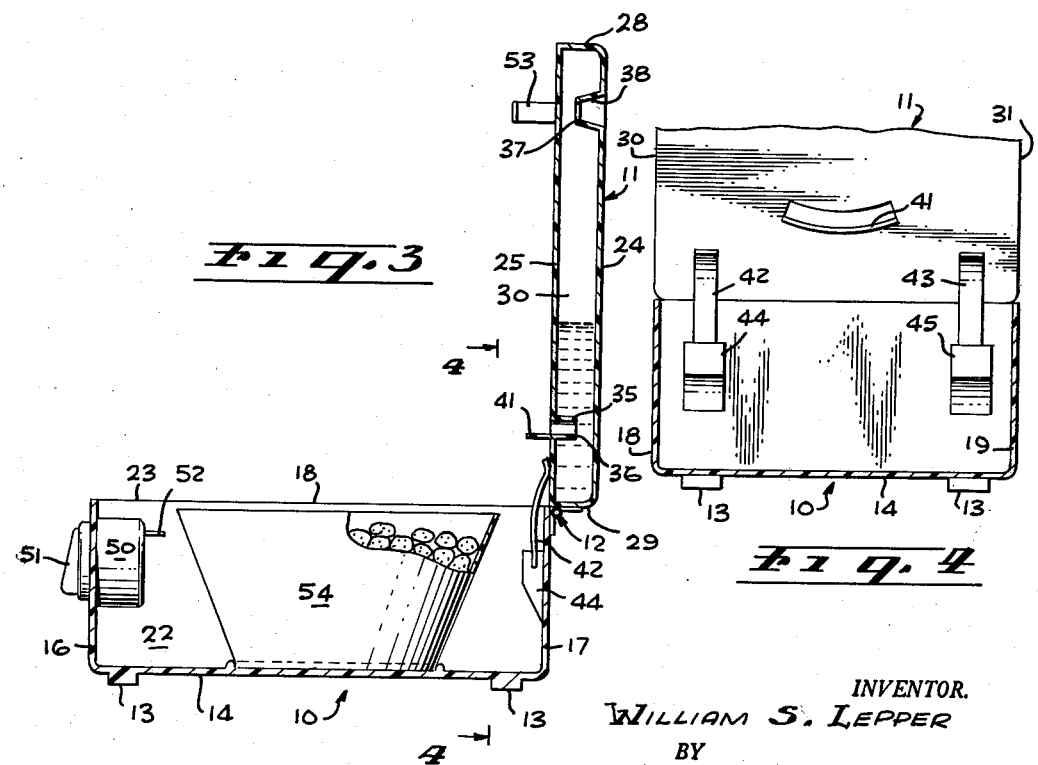
INVENTOR.
WILLIAM S. LEPPER
BY
Beehler & Shanahan
ATTORNEYS

United States Patent Office 3,137,272
Patented June 16, 1964

3,137,272
ANIMAL FEEDER
William S. Lepper, 12 Toluca Estates Drive,
North Hollywood, Calif.
Filed Dec. 6, 1962, Ser. No. 242,699
7 Claims. (Cl. 119—51.12)

The application relates to feeding devices for animals such as dogs and cats which need to be fed with some degree of regularity and from which food must usually be kept until the proper feeding time comes. The invention is more particularly concerned with a device in which food may be retained, sometimes in a partly prepared form for eating, within easy reach of the animal but closed to prevent access to it in a fashion which enables the closure to be released at a certain time, at which time completion of preparation of the food is accomplished and the animal is given access.

When animals are left to themselves for a period of time which extends through their regular feeding time, food must be made available to them. Considering the nature of dogs and cats, it is not possible to leave food within reach of the animal because the animal will immediately eat the food and then go through the usual feeding time without proper feeding and putting the animal off the regular food schedule produces some bothersome effects.

Although some attempts have been made to provide permanent feeding devices, most of these have been complicated and expensive, especially when they are constructed so as to be built into some permanent structure. In other instances, the working parts have been numerous and somewhat complicated which has resulted in these devices being somewhat undependable when left for a period of time. Further still, most of them have not taken into consideration the fact that different kinds of food ingredients need to be kept separate until feeding time comes and hence they have been useful for only a limited variety of food.

It is therefore among the objects of the invention to provide a new and improved animal feeder of a type which can be constructed as a unit to be placed anywhere and which is capable of effectively keeping food out of reach of the animal until the proper time at which time the food is made immediately available.

Another object of the invention is to provide a new and improved portable animal feeder which is small and compact and of such character that it can be placed virtually anywhere in a space reserved for animals.

Another object of the invention is to provide a new and improved animal feeder capable of keeping apart different food ingredients until feeding time arrives and then being capable of bringing the separate ingredients together at the same time that the mixture is made accessible to the animal.

Still another object of the invention is to provide a new and improved animal feeder in which a timer is incorporated capable of being set for a long time in advance of actual feeding time so that the animal can be fed unattended on a proper schedule with food which, at times, needs to be mixed only at the time it is eaten.

Still further among the objects of the invention is to provide a new and improved animal feeder capable of being timed to make a food mixture available properly on schedule which is simple in its arrangement to permit it to be easily washed, which can be made in virtually any size, and which is not only of relatively inexpensive construction but which is also one not prone to get out of order.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:
FIGURE 1 is a front-perspective view of the animal feeder in closed position;
FIGURE 2 is a longitudinal, sectional view of the feeder in closed position;
FIGURE 3 is a longitudinal, sectional view of the feeder in open position;
FIGURE 4 is cross-sectional view taken on the line 4—4 of FIGURE 3.

In an embodiment of the invention chosen for the purpose of illustration, the animal feeder is shown incorporated in a housing 10 over which fits a cover 11. A hinge 12, having parts fastened respectively to the housing 10 and the cover, permits the cover to be tilted upwardly from the position of FIGURE 2 to the position of FIGURE 3. Short legs 13 are preferably employed on a bottom 14 of the housing to support the feeder upon an appropriate surface 15.

The housing consists of a front wall 16, a rear wall 17, and side walls 18 and 19, the side walls having respective tapered portions 20 and 21 to give the housing the shape illustrated advantageously in FIGURE 1. The bottom 14, together with the walls of the housing, forms a chamber 22 having an open top 23.

The cover 11 consists of an upper wall 24 and a lower wall 25 parallel and spaced vertically one from another in closed position of the cover as shown in FIGURE 2. A perimetral wall extends entirely around the perimeters of the upper and lower walls in order to enclose a water reservoir 27. The perimetral wall consists of specifically a front wall 28, a rear wall 29, side walls 30 and 31, and tapered wall portions 32 and 33, these being walls coinciding with the respective walls of the housing 10.

In the reservoir 24 is a stand pipe 35 having a top 36 which is located above the bottom 37 of a fill spout 38, extending through the upper wall 24 of the cover. The bottom of the fill spout is a hole stoppered in the present instance by employment of a cork 39. When water is poured into the reservoir through the fill spout, it is added in sufficient quantity to bring the liquid in the reservoir up to a level 40 which is below the top of the stand pipe and, accordingly, water will not flow out of the reservoir as long as the cover is closed upon the housing. At the bottom of the stand pipe is a deflector 41 which is useful in directing water flowing from the reservoir when the cover is raised.

In order to raise the cover, there are provided extension springs 42 and 43 secured in respective spring keepers 44 and 45 attached to the rear wall 17 of the housing.

A manually set timer indicated generally by the reference character 50 is mounted in the front wall 16 of the housing, the timer being provided with a setting knob 51 at the front. At the rear of the timer is a hook here taking the form of a pin 52 which is adapted to engage a complementary hook 53 attached to an adjacent portion of the lower wall 25 of the cover.

In the chamber 22 is a receptacle or food container 54 which is adapted to contain dry food of any desired variety. The food container is entirely removable but when in place is low enough so that there is no obstruction to closing the cover to the position illustrated in FIGURES 1 and 2. A catch 55 may, if desired, be employed on the front wall 16 of the housing in a position of engagement with a catch pin 56 on the front wall 28 of the cover so that the cover can be hooked in place when the device is not set to be opened at any particular time.

In use, the food container, removed if desired, is filled with sufficient dry animal food for one feeding and placed in the chamber 22 in the housing. The cover is then moved to closed position and in that position the hooks 52 and 53 are brought into engagement as shown in FIGURE 2. At the same time, the timer is set for a selected number of hours so that it will release the hooks one from another when the selected time period has elapsed. The reservoir is filled with a desired amount of water. This may be a quantity of water bringing the level up to the level 40 or anything less than such quantity. In either event, the level of the water will be below the top of the stand pipe 35. Hence, there will be no prospect of water mixing with the dry food during the time period prior to tripping of the timer.

Assuming, for example, that a family may desire to leave home in the morning and have the pet fed at 5:00, if the feeder is placed in operation at 10:00 in the morning, the timer will be set to trip seven hours later, and, inasmuch as it remains closed during the entire intervening period, it can be left in the yard or the pen with the animal for the entire period. When, in the chosen example, the seven hour period has passed, the timer will be tripped and disengage the hooks 52 and 53 thereby permitting the cover to be raised by operation of the springs 42 and 43. Needless to say, the catch 55 will be in disengaged position at this time.

When the cover raises to approximately the position of FIGURE 3, pivoting upon the hinge 12, the water in the reservoir 27 will then pass to the lower end of the reservoir as viewed in FIGURE 3 and the water will flow outwardly through the stand pipe which at this time will be in a horizontally extending position. Moreover, to make certain that there will be a full direction flow, the cork may have been previously removed. The deflector 41 of the stand pipe is useful in making certain that as water flows from the reservoir it will pour directly into the food container 54 and immediately wet the dry food which has been left there. The wetting takes place promptly and the food in the container, wetted in this fashion, is immediately ready for the animal to eat.

At some later time, and possibly the following morning, the receptacle can be removed for washing and subsequent use. By having the receptacle completely removable, it is unnecessary to have the interior of the housing dirtied at all by the operation and hence there will be virtually no cleaning necessary for this. The receptacle, of course, can be of any shape or size as long as it is small enough to fit within the chamber 22 and, of course, can be filled with more or less of the dry food depending on the size of the animal to be fed. Once the timer has been tripped as described, the entire apparatus remains in the position of FIGURE 3 until manually closed or until it is reset for use again.

From the foregoing description, it will be noted that if the timer is a 12 hour timer an animal can be left for as long as 36 hours permitting a pet to be left for an overnight period and still be fed on regular schedule once during the period. If a longer period is desired, a 24 hour timer can be made use of. This could be set the preceding day so as to release food for the animal 24 hours later and this would make possible leaving a pet for as long as 48 hours while still having the pet fed on regular schedule.

Moreover, since the device is a unitary device, it can be placed virtually anywhere either within a cage or yard if the pet is kept in such a place or virtually anywhere that a pet might be permitted to remain while the owner is away. The parts, moreover, are extremely simple so that they can be built ruggedly and durably thereby being certain to operate without fail and also being of such character that use may continue for a long time without need arising for servicing or replacement of any of the relatively few simple parts. Moreover, if need be, the housing could be fastened by appropriate fasteners to a selected support so that it could not be moved either by the animal or by persons inadvertently while still permitting ready removal of the food container whenever that might be necessary. Further still, the container can well be made so as to have the cork 39 left in the fill spout so that the water in the reservoir cannot be contaminated and under such circumstances a suitable vent hole may be provided either through the cork or in some other portion of the upper wall 24 or the upper edge of the perimetral wall in order to make certain that there is air available to displace the water when it flows out through the stand pipe in raised position of the cover.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An animal feeder comprising a housing having a chamber therein for one form of food ingredient, said chamber having an open top, a cover attached to said housing having a chamber therein for another form of food ingredient, said cover having a closed position covering the chamber and an open position removed from said chamber, said cover being biased in a direction tending to move the cover to open position, a passage from one of said chambers to the other operative to pass a food ingredient therebetween only when said cover is in open position, a retention device having one element on the housing and another complementary element thereof on said cover, one of said elements comprising a timer device operatively associated with the other element and adapted to release said retention device at a preset time interval.

2. An animal feeder comprising a housing for animal food having a chamber therein with an open top, a hollow cover forming a water reservoir attached to said housing and having a closed position covering the chamber and an open position removed from said chamber, said cover being biased in a direction tending to move the cover to open position, a retention device having one element on the housing and another complementary element thereof on said cover, one of said elements comprising a timer device operatively associated with the other element and adapted to release said retention device at a preset time interval, said cover having a water delivery passage extending between the water in the reservoir and the housing and operative to permit water flow only when the cover is in open position whereby to pass water from the reservoir into the housing.

3. An animal feeder comprising a housing having a chamber therein for one form of food ingredient, said chamber having an open top, a cover tiltably attached to said housing and having a closed position covering the chamber and an open position removed from said chamber, said cover having a chamber therein for another form of food ingredient and a passageway from the second identified chamber having an operative position to permit passage of a food ingredient from one of said chambers to the other, spring means between the housing and the cover biased in a direction tending to move the cover to open position, a retention device having one element on the housing and another complementary element on said cover, one of said elements comprising a timer mechanism operatively associated with the other element and adapted to release said retention device at a preset time interval, said passageway being shiftable to said operating position upon release of said retention device, and a separate food receptacle in said chamber adapted to be removed from the chamber for cleaning.

4. An animal feeder comprising a housing having a chamber therein with an open top, a hollow cover forming a water reservoir tiltably attached to said housing and having a closed position covering the chamber and an open position removed from said chamber, spring means between the housing and the cover biased in a direction tending to move the cover to open position, a retention device having one element on the housing and another complementary element on said cover, one of said elements comprising a timer mechanism operatively associated with the other element and adapted to release said retention device at a preset time interval, and a separate food receptacle in said chamber adapted to be removed from the chamber for cleaning, said cover having a water delivery passage extending between the water in the reservoir and the housing and operative to permit water to flow only when the cover is in open position whereby to pass water from the reservoir into the housing.

5. An animal feeder comprising a housing having walls forming a chamber with an open top, a cover comprising walls forming a liquid reservoir for retention of water, a pivotal connection between the cover and the housing and means acting between the housing and the cover biased in a direction tending to move said cover from a closed position covering the open top of said chamber to an open position, a retention device between said cover and said housing comprising elements respectively on the housing and the cover, one of said elements comprising a hook and the other of said elements comprising a preset timer having a complementary hook engageable with said first hook when the cover is in closed position, a water pipe having an opening at one end in said reservoir out of communication with the water when the cover is in closed position and in communication with the water when the cover is in open position, said pipe having the other end opening into the housing, said housing comprising a food container in the chamber having a portion thereof at a location adjacent said other end of the pipe and adapted to receive water from the reservoir when the cover is in open position.

6. An animal feeder comprising a housing having walls forming a chamber with an open top, a cover comprising walls forming a liquid reservoir for retention of water, a pivotal connection between the cover and the housing and means acting between the housing and the cover biased in a direction tending to move said cover from a closed position covering the open top of said chamber to an open position, a retention device between said cover and said housing comprising elements respectively on the housing and the cover, one of said elements comprising a hook and the other of said elements comprising a preset timer having a complementary hook engageable with said first hook when the cover is in closed position, a stand pipe in said reservoir, said stand pipe having an opening at one end into said chamber and at the other end into said reservoir, a filler passage for said reservoir, said other end of said stand pipe being above the full level of said reservoir, said housing comprising a food container in the chamber having a portion thereof at a location adjacent said one end of the stand pipe and adapted to receive water from the reservoir when the cover is in open position.

7. A portable animal feeder comprising a housing having front, side, and rear walls forming a chamber with an open top, a cover comprising spaced upper and lower walls and a perimetral wall forming a liquid reservoir for retention of water, a pivotal connection between the cover and the housing at one wall of said housing and a spring acting between the housing and the cover biased in a direction tending to move said cover from a closed position covering the open top of said chamber to an open position, a retention device between said cover and another wall of said housing comprising elements respectively on the housing and the cover, one of said elements comprising a hook and the other of said elements comprising a manually preset mechanical timer having a complementary hook engageable with said first hook when the cover is in closed position, a stand pipe in said reservoir at the end adjacent said pivotal connection, said stand pipe having an opening into said chamber and a deflector on the pipe adjacent said opening, a filler passage from the exterior of the upper wall of the cover into said reservoir, said stand pipe having an upper end above the full level of said reservoir and a removable food container in the chamber having a portion thereof at a location adjacent the said deflector and adapted to receive water from the reservoir when the cover is in open position.

References Cited in the file of this patent
UNITED STATES PATENTS

| | | |
|---|---|---|
| 1,274,845 | Bird | Aug. 6, 1918 |
| 2,157,682 | Sweeny | May 9, 1939 |
| 2,752,995 | Dodge | July 3, 1956 |